United States Patent [19]
Story et al.

[11] 3,773,393
[45] Nov. 20, 1973

[54] TRACK ROLLER ASSEMBLY

[75] Inventors: Thomas A. Story, Aurora; Peter B. Cadou, Shaker Heights, both of Ohio

[73] Assignee: General Motors Corporation, Detroit, Mich.

[22] Filed: Sept. 20, 1972

[21] Appl. No.: 290,462

[52] U.S. Cl.................. 305/14, 305/28, 308/18
[51] Int. Cl............................................ B62d 55/14
[58] Field of Search .................. 305/14, 28; 308/18

[56] References Cited
UNITED STATES PATENTS

| | | | |
|---|---|---|---|
| 1,796,533 | 3/1931 | Pearson | 305/28 X |
| 3,116,957 | 1/1964 | Fikse | 305/14 |
| 2,827,339 | 3/1958 | Zunich | 308/18 |
| 2,823,079 | 2/1958 | Williams | 305/14 |
| 3,088,782 | 5/1963 | Conlan | 305/28 X |

FOREIGN PATENTS OR APPLICATIONS

| | | | |
|---|---|---|---|
| 925,572 | 3/1955 | Germany | 305/14 |

Primary Examiner—Richard J. Johnson
Attorney—William S. Pettigrew et al.

[57] ABSTRACT

A track roller assembly including a track roller having axially aligned axle shafts rotatably mounted within end caps which are securable to the track frame of a crawler tractor. Each end cap is provided with a bearing assembly which includes a sleeve-type bushing and a disc-type washer which respectively serve to absorb radial and thrust loads. The inner circumferential bearing surface of the bushing is partially relieved at points adjacent the opposite edges of the bushing so as to prevent binding of the axle shafts due to misalignment between the axle shafts and the end caps.

4 Claims, 8 Drawing Figures

TRACK ROLLER ASSEMBLY

This invention concerns track roller assemblies for tracked vehicles such as crawler tractors. As is well known, the usual crawler tractor includes a main tractor chassis and longitudinally extending track frames which are connected to the opposite sides of the chassis. The track frames support the endless tracks of the vehicle and are formed by a pair of laterally spaced longitudinally extending frame members or rails. A plurality of track roller assemblies are mounted in longitudinally spaced relation along each track frame for rolling contact with the ground engaging portion of the endless tracks, and each roller assembly usually includes a roller body rotatably supported from end caps or support members at the opposite ends thereof which are rigidly secured to the frame members of the track frame. The support means for the roller body take various forms but inevitably include either sleeve-type bearings or roller bearings used for reducing friction and wear. The sleeve-type bearings or bushings have certain advantages over roller bearings in that they are less expensive and require less space, however, because the friction area is quite large, damaging heat can result if adequate lubrication is not provided. As is well known, heat buildup at times is quickly followed by scoring of both the bushing and the shaft resulting in a worn bushing which will not hold the shafts in proper alignment. Accordingly, the ideal type of bushing arrangement for a track roller should be one in which the thrust bushing is placed in a position where it can provide maximum thrust area and at the same time obtain sufficient lubrication so as to prolong the life of the bushing. Also, the thrust bushing should be positioned so as to experience a minimum amount of surface speeds while being capable of serving as a heat dissipator of any heat induction as a result of thrust loading. In addition, the radial bushing should be so designed as to ensure against binding which might result from initial misalignment and deflections which might occur under load.

This invention contemplates a track roller which meets the above requirements by having a roller body formed with a pair of axially aligned axle shafts rigidly secured thereto and projecting from the opposite ends thereof. Each of the axle shafts has a cylindrical outer surface and an end surface which lies in a plane perpendicular to the longitudinal center axis of the axle shafts. A pair of laterally spaced end caps receive the respective axle shafts and serve to support them for rotation within a dead-end bore which is defined by a cylindrical inner wall and an end wall. A bearing assembly is mounted in the bore and interposed between the end cap and the axle shaft and includes a sleeve-type cylindrical bushing fixedly supported by the inner wall and a disc-type thrust washer secured to the end wall. The cylindrical bushing is characterized by having the inner surface thereof partially relieved adjacent the opposed edges of the bushing so as to prevent binding of the axle shafts in the end caps due to misalignment therebetween. Moreover, the disc-type thrust washer is located in a position for direct contact with the end surface of the axle shaft so as to provide maximum thrust area at minimum surface speeds.

The objects of the present invention are to provide a track roller assembly of the live shaft type utilizing a sleeve-type bushing which is partially relieved adjacent the opposed edges thereof so as to compensate for misalignment between a roller axle shaft and mounting; to provide a live shaft track roller in which each integral axle shaft is carried within an end cap having a sleeve-type bushing for absorbing the radial loads and a disc-type washer for absorbing thrust loads; to provide a track roller assembly for a crawler tractor that is rotatably supported at each end by a sleeve-type bushing and disc-type thrust washer which are provided with suitable channels for allowing lubricant to flow to the wear surfaces for minimizing frictional wear thereof; and to provide a bearing assembly for the stub shafts of a live shaft track roller that includes a sleeve-type bushing and a thrust washer, both of which are fixedly secured within a cylindrical bore formed in end caps which are mountable to the track frame of a crawler tractor.

Other objects and advantages of the present invention will be apparent from the following detailed description when taken with the drawings in which.

Figure 3:
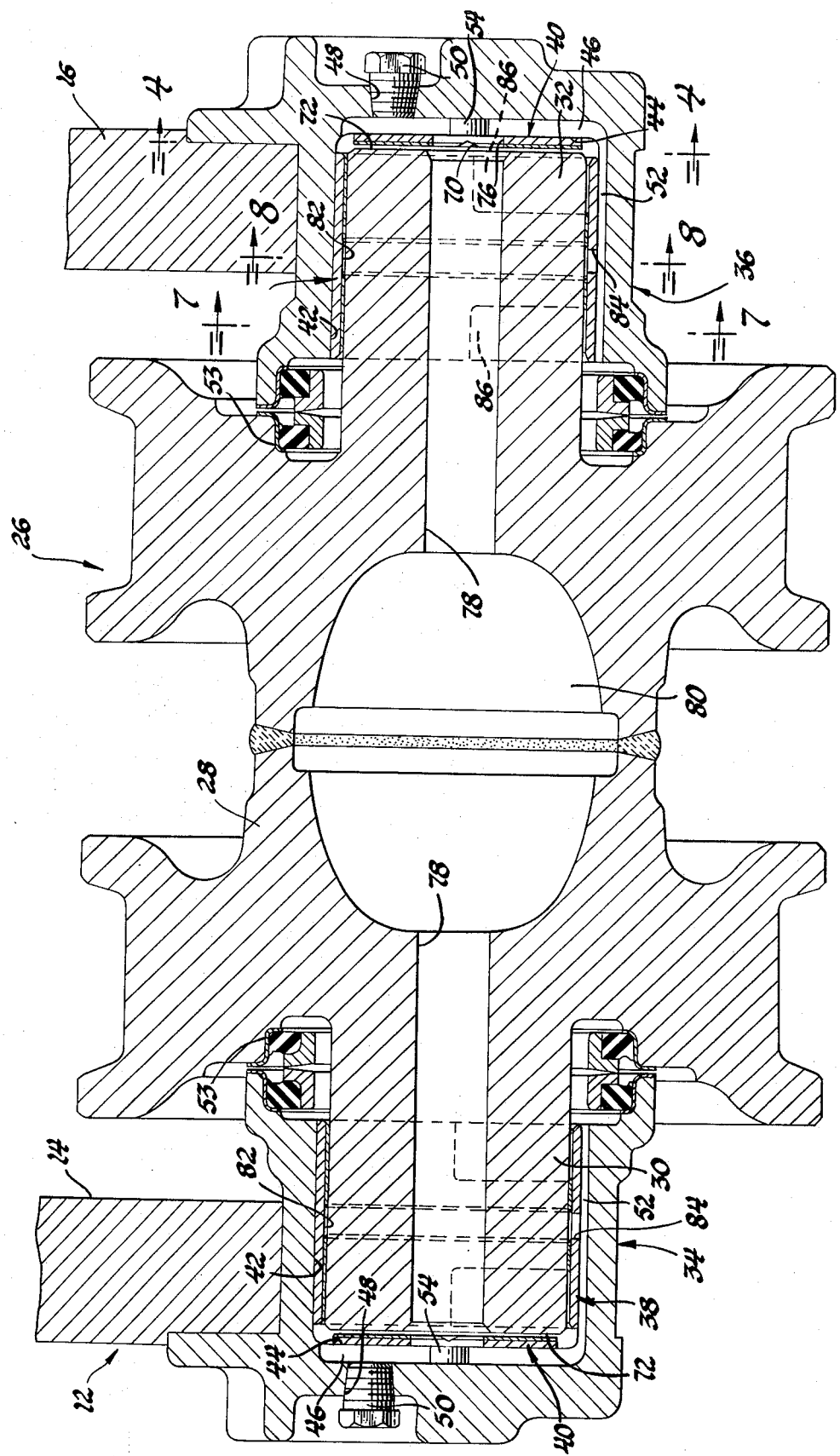
FIG. 3 is an enlarged view taken on line 3—3 of FIG. 1.
Figure 4:
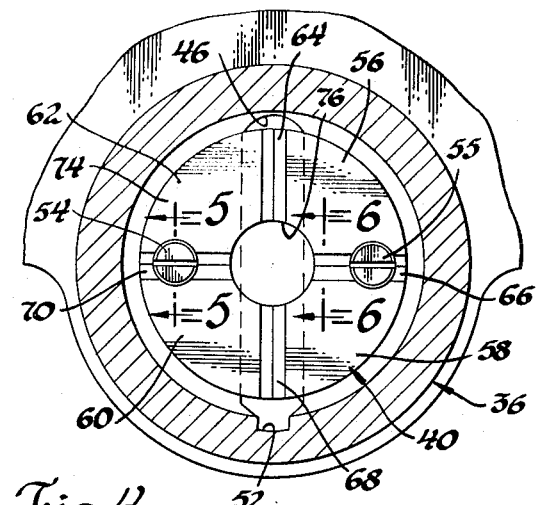
FIG. 4 is a view taken on line 4—4 of FIG. 3.
Figure 5:
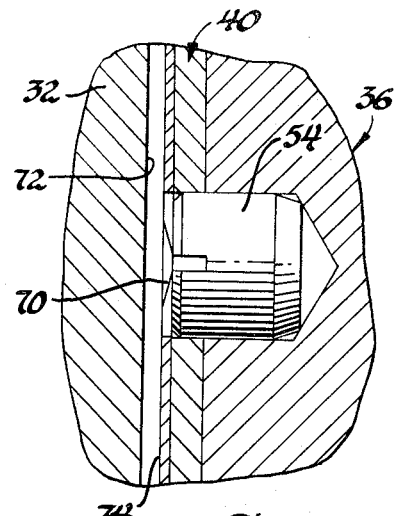
Figure 6:
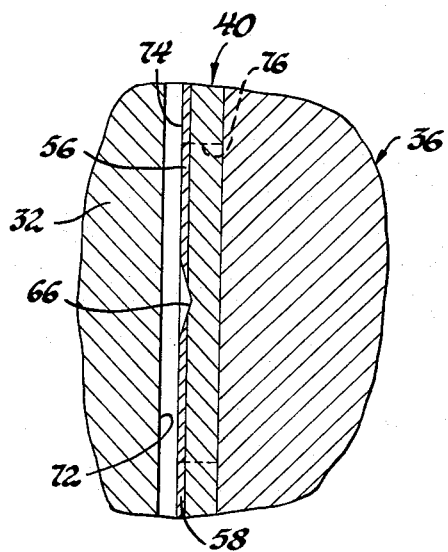
Figure 7:
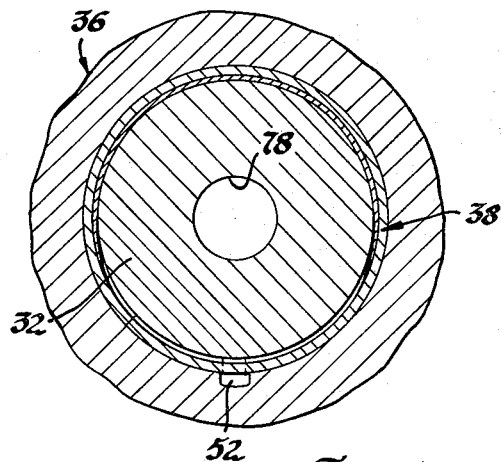
Figure 8:
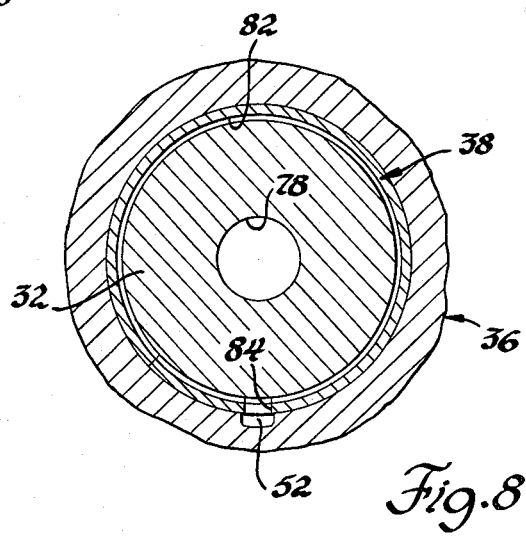

FIGS. 5 and 6 are enlarged sectional views taken on lines 5—5 and 6—6 of FIG. 4; and FIGS. 7 and 8 are cross-sectional views taken on lines 7—7 and 8—8 of FIG. 3.

Figure 1:
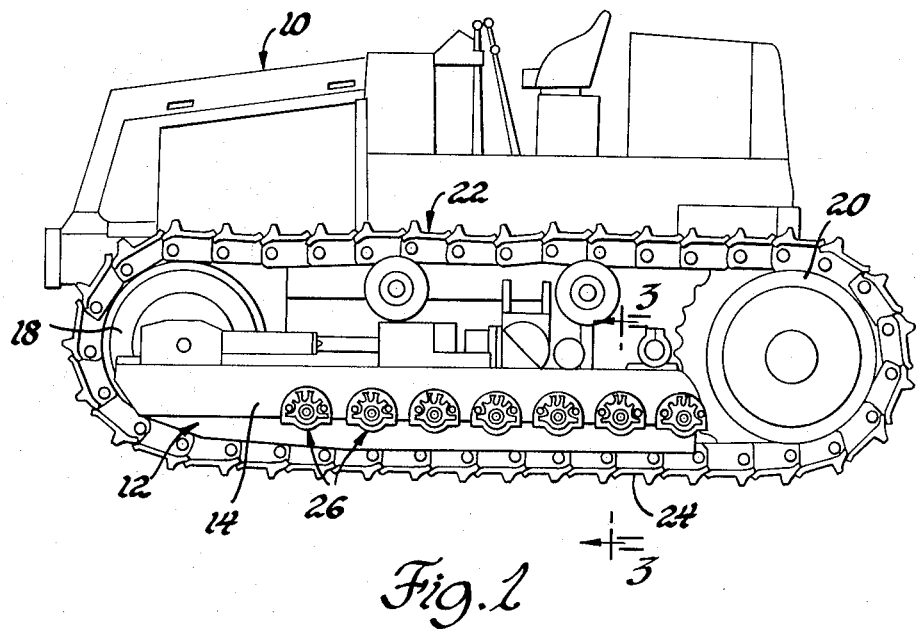
FIG. 1 is a side elevational view of a crawler tractor equipped with a plurality of track roller assemblies made according to this invention.

Referring to the drawings and more particularly FIG. 1 thereof, a crawler tractor 10 is shown which includes the usual longitudinally extending track frame 12 located on each side of the vehicle. In this case, the track frame 12 on the left side of the vehicle is shown only and as seen in FIG. 3, each track frame 12 includes rigid interconnected and laterally spaced frame members or rails 14 and 16. The forward end of each track frame 12 supports an idler wheel 18, while the rear end of the tractor has a sprocket wheel 20 which extends into substantial alignment with each of the respective track frames. A ground engaging endless track 22 is entrained about the idler and sprocket wheels of each track frame 12 and the sprocket wheels are driven through a suitable engine and gear train (not shown) for propelling the vehicle in a manner well known in the art. The ground engaging portion 24 of each endless track intermediate the idler and sprocket wheels is engaged and supported by a plurality of live shaft track roller assemblies 26 which are spaced longitudinally of each track frame. As best seen in FIG. 3, each track roller assembly 26 includes a roller body 28 which has the periphery thereof suitably flanged so as to engage and guide the track links of the endless tracks.

The roller body 28 is intergrally formed with axially aligned stub axle shafts 30 and 32 which project outwardly from the opposite ends of the roller body 28. The axle shafts 30 and 32 are rotatably supported by a pair of laterally spaced end caps 34 and 36 which are secured to the rails 14 and 16 respectively of the track frame 12. Each end cap 34 and 36 fixedly supports a bearing assembly which is interposed between the axle shaft and its associated end cap so as to provide substantially frictionless rotation of the track roller assembly. The bearing assembly in each end cap 34 and 36 is identical in construction and includes a sleeve-type bearing or bushing 38 and a disc-type thrust washer 40, both of which cooperate for absorbing and transferring loads imposed on the roller both radially and axially thereof.

Each end cap 34 and 36 is formed with a dead-end bore defined by a cylindrical inner wall 42 and an end wall 44. As seen in FIGS. 3 and 4, the end wall 44 has a vertically extending channel 46 formed therein which is adapted to receive a liquid lubricant such as oil which is introduced into the roller assembly through a port 48 which in this case is closed by a threaded plug 50. The channel 46 connects with a longitudinally extending groove 52 formed in the lower portion of inner wall 42 that serves to allow the lubricant to flow to bushing 38 and also to a suitable seal means 53 interposed between the inboard end of the end cap and the roller body.

It will be noted that the end wall 44 serves as a flat support for the thrust washer 40 which is centered in the bore by a pair of recessed dowels 54 and 55 as seen in FIGS. 4 and 5. It will also be noted that the flat outer wear face of the thrust washer 40 is divided into four pie-shaped sections 56, 58, 60, 62 by two pairs of axially aligned grooves 64, 66, 68 and 70. Each pair of aligned grooves is located along an axis which is perpendicular to the axis of the other pair of aligned grooves. As best seen in FIGS. 5 and 6, the grooves are V-shaped in cross section and serve as channels for the lubricating oil which is conveyed to the wear surface of each of the sections 56, 58, 60 and 62 of the thrust washer 40 by the rotating end surface 72 of each of the stub axle shafts. The end surface 72 in each instance is located in a vertical plane which is parallel to the wear surface on the adjacent thrust washer and the end wall 44. The wear surface of the thrust washer 40 as well as the inner surface of the bushing have a bronze coating 74 of twenty to thirty thousandths of an inch which serves as the wear material.

The thrust washer 40 is formed with a centrally located circular opening 76 which is axially aligned with an elongated passage 78 that extends through each axle shaft. As seen in FIG. 3, each passage 78 opens into an enlarged cavity 80 in the roller body 28 that serves as a reservoir for the lubricating oil. Thus, it should be apparent that, in operation, the cavity 80 as well as the passages 78 are completely filled with the lubricating oil which can then flow via the channel 46 and groove 52 to lubricate the seals 53 and also the wear surfaces of the thrust washer 40 and the bushing 38.

Figure 2:
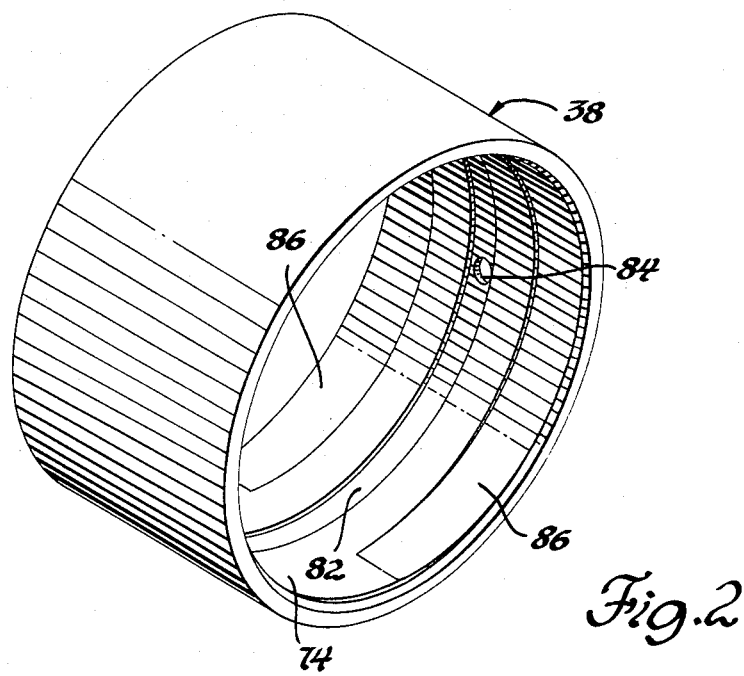
FIG. 2 is an isometric view showing a sleeve-type bushing incorporated with each track roller assembly of FIG. 1.

As seen in FIGS. 2 and 3, the bushing 38 is cylindrical in form and has an inner surface which as aforementioned is coated with bronze. Intermediate the outer edges of the bushing an annular groove 82 is formed into the inner surface of the bushing and the groove 82 communicates with an opening 84 that leads to the groove 52. Thus, lubricating oil in the groove 52 can flow via the opening 84 into the groove 82 for lubricating the wear surface of the bushing 38. It will also be noted that adjacent each edge of the bushing is a relieved portion 86 which extends approximately 120° about the inner circumferential surface of the bushing. The relieved portions 86 together with the groove therefore define two narrow strips of wear surface which merge with the wear surfaces at the upper end of the bushing as seen in FIG. 3. The relieved portions 86 serve to allow the track roller to rotate without binding in an instance where minor misalignment between the stub axles and the end caps may exist. Moreover, by having the upper portion of the inner surface of the bushing coated with bronze as described hereinbefore, a maximum amount of surface area is provided for absorbing the loading imposed upon the track roller during operation of the crawler tractor of FIG. 1.

As mentioned above, one advantage of the track roller assembly 26 is its ability to operate satisfactorily even though there may be some misalignment of the stub axles 30 and 32 relative to the end caps 34 and 36 and also during times when deflections occur under load. In addition, it will be noted that by having the thrust washer 40 formed and positioned as described, a maximum amount of thrust area is provided at points where the surface speed of the end surface 72 is at a minimum since the wear surfaces are located relatively close to the center of rotational axis of the stub axles. In other words, surface speed is directly proportional to the distance from the center of rotation and therefore the further that the wear surfaces are located from the center the higher the surface speed. In this particular design, by having the wear surfaces positioned near to the rotational axis of the stub axles, slower surface speeds are realized with less heat frictional generation and total wear. Another advantage of this design is that heat transfer from the bearing assembly is minimized with the end caps 34 and 36 serving as a means for dissipating heat by convection to the ambient air surface.

Various changes and modifications can be made in this construction without departing from the spirit of the invention. Such changes and modifications are contemplated by the inventor and he does not wish to be limited except by the scope of the appended claims.

I claim:

1. A track roller assembly adapted to be mounted on a track frame of a tracked vehicle comprising a track roller, a a pair of axially aligned axle shafts rigidly secured to and projecting from the opposite ends of said track roller, each of said axle shafts having a cylindrical outer surface and an end surface lying in a plane perpendicular to the longitudinal center axis of said axle shafts, an end cap having a bore formed therein defined by a cylindrical inner wall and an end wall for receiving and supporting each of said axle shafts for rotation about said longitudinal center axis, a bearing assembly mounted in said bore and interposed between the end cap and the axle shaft, said bearing assembly including a sleeve type bushing fixedly supported by said inner wall and having a cylindrical inner bearing surface for engaging the outer surface of the axle shaft and absorbing radial loads, and a disc-type washer secured to said end wall and having a flat outer bearing surface located in a plane parallel to said end surface for absorbing thrust loads, said inner bearing surface being partially relieved at the side edges of the bushing so as to prevent binding of said axle shafts in said end caps due to misalignment therebetween.

2. The track roller assembly of claim 1 wherein said inner bearing surface is relieved along an arc bounded by a pair of radii originating at the center of the bushing and spaced by an angle greater than 90° but less than 180°.

3. The track roller assembly of claim 1 wherein sealing means are provided between said track roller and said end cap inboard of said bearing assembly.

4. A live shaft track roller assembly adapted to be mounted on a crawler tractor track frame having a pair of spaced frame members, said live shaft track roller assembly comprising a track roller disposed between said frame members and having a cavity for storing a liquid lubricant, a pair of axially aligned axle shafts rigidly secured to and projecting from the opposite ends of said track roller, each of said axle shafts having a cylindrical outer surface and an end surface lying in a plane perpendicular to the longitudinal center axis of said axle shafts, a pair of axially aligned end caps rigidly secured to said frame members, each end cap having a bore formed therein defined by a cylindrical inner wall and an end wall for receiving and supporting an axle shaft for rotation about said longitudinal center axis, a bearing assembly mounted in said bore and interposed between the end cap and the axle shaft, said bearing assembly including a sleeve type bushing fixedly supported by said inner wall and having a cylindrical inner bearing surface for engaging the cylindrical outer surface of the axle shaft and absorbing radial loads, an annular groove formed in said inner bearing surface intermediate the side edges of the bushing, a disc-type washer secured to said end wall and having a flat outer bearing surface divided into four sections by a pair of grooves located along mutually perpendicular axes, said flat outer bearing surface being located in a plane parallel to said end surface for absorbing thrust loads, the axle shafts having passages formed therein for connecting the cavity with said grooves formed in the bushings and the disc-type washer, the annular groove in inner bearing surface and the grooves in the flat outer bearing surface serving as conduits for allowing the liquid lubricant to flow from said cavity and through said passages to said bearing surfaces, and said inner bearing surface of the bushing being partially relieved at the side edges of the bushing so as to prevent binding of said axle shafts in said end caps due to misalignment therebetween.

* * * * *